ELECTRIC LEVEL-RESPONSIVE CIRCUITS

Filed April 22, 1966 2 Sheets-Sheet 1

INVENTORS
JOHN B. PATRICKSON
VICTOR S. DAVEY
LEONHARD M. WEDEPOHL
BY
Watson, Cole, Grindle + Watson
ATTORNEYS

ELECTRIC LEVEL-RESPONSIVE CIRCUITS

Filed April 22, 1966 2 Sheets-Sheet 2

INVENTORS
JOHN B. PATRICKSON
VICTOR S. DAVEY
LEONHARD M. WEDEPOHL
BY
Watson, Cole, Grindle & Watson
ATTORNEYS

United States Patent Office 3,465,208
Patented Sept. 2, 1969

3,465,208

ELECTRIC LEVEL-RESPONSIVE CIRCUITS

John Brian Patrickson, South Shields, Victor Stanley Davey, Melton Park, Newcastle-Upon-Tyne, and Leonhard Martin Wedepohl, Disley, England, assignors to A. Reyrolle & Company Limited, Hebburn, England, a company of Great Britain

Filed Apr. 22, 1966, Ser. No. 544,449
Claims priority, application Great Britain, Apr. 23, 1965, 17,291/65
Int. Cl. H01h *47/02, 47/22*
U.S. Cl. 317—123 10 Claims

ABSTRACT OF THE DISCLOSURE

An electric signal level-responsive circuit includes a switching device rendered operative and inoperative in response to first and second predetermined levels, respectively, of an alternating or pulsating signal input. The first predetermined level is greater than the second predetermined level to form a first reset ratio of the switching means which is substantially below unity. An accumulating or integrating circuit stores pulse output signals from the switching means in response to the first signal level to provide a signal output at a predetermined level determined by the duration and number of signal pulses stored by the accumulating means. The predetermined level in the accumulating means, together with the first predetermined level, forms a second reset ratio of the apparatus which is substantially equal to unity. The accumulating circuit may include a feedback network connected to an input circuit to modify the first reset ratio.

Figure 1:
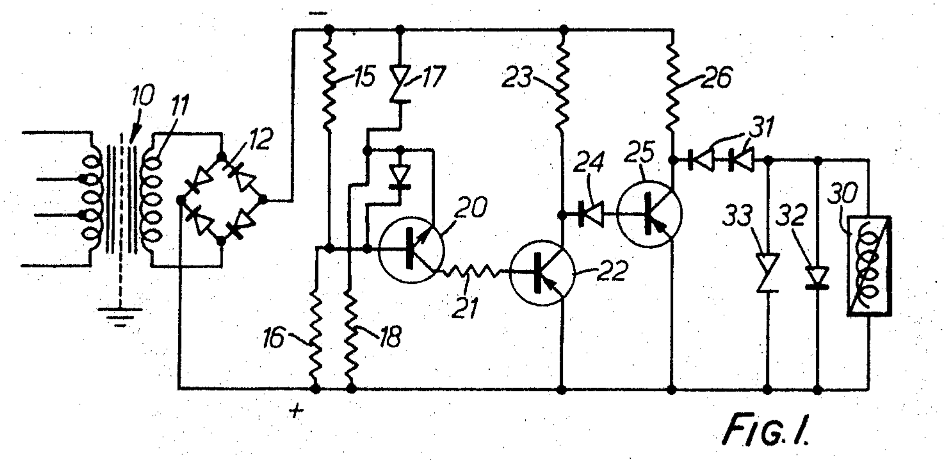

This invention relates to electric level-responsive circuits and is particularly though not exclusively, concerned with level-responsive circuits for use in protective systems.

According to the present invention an electric level responsive circuit includes a switching device arranged to respond in each half cycle of an alternating supply only if the level of a signal exceeds a predetermined value, and to be thereafter reset. Preferably accumulating means are provided responding to the cumulative effect of a number of pulses of current passed by the switching device.

The switching device may be of static semiconductor type, for example a transistor trigger circuit, or it may include a reed type relay.

The term accumulating means is used herein to include not merely apparatus giving an accurate mathematical integral of an input quantity, but also apparatus responding generally to the cumulative effect of a number of pulses of current passed by the switching device.

The invention renders it possible to obtain a reset ratio, that is to say a ratio of the value of the signal at which the device resets to the value at which it responds, considerably higher than conventional devices, and in fact approaching unity. This is due to the fact that the switching device of the level detector responds and resets fully on each half cycle of the A.C. supply, so that failure to operate on a succeeding half cycle is equivalent to resetting at the operating level. The pulses of current supplied by the switching device are accumulated or smoothed by the accumulating means to provide a useful output, for example for actuating tripping means.

The power required for the device may be obtained from the input circuit or from a separate power supply or partly from one and partly from the other.

The circuit may be arranged to measure single quantities, such as current or voltage, against its own setting. Thus in one form of the invention the switching device is fed through a network including two potential dividers, constituting a bridge one arm of which includes a Zener diode.

The output of the bridge may be connected to a transistor amplifier to respond when the balance is in one direction.

In another form of the invention, intended to give an impedance type response, the switching device is fed with a three-component signal comprising a substantially constant direct or smoothed polarising signal, a direct or smoothed restraining signal representing voltage in opposition to the polarising signal, and an alternating or pulsating operating signal representing current reinforcing the polarising signal. Similarly for other types of protection the switching device may be fed with a differential signal comprising only the difference between a pulsating or alternating operating signal and a substantially direct or smoothed polarising signal.

The accumulating means may include a reed type relay (whether or not a relay of this type is employed in the switching device). This type of relay inherently provides a certain degree of trigger action. Thus if a reed type relay responds when the instantaneous value of current supplied to it exceeds a certain threshold it will not reset until that value has decreased to a considerably lower value. Accordingly if the current only exceeds that threshold value for a very short period the contacts of the reed relay may remain closed for a very much longer period. Various arrangements may be provided to supplement this effect.

Thus in one arrangement the accumulating means include a component which has appreciable inductance, and is shunted by a diode permitting circulating current to maintain current in the relay coil between current pulses from the switching means.

This component may be constituted by or connected in series with a relay (whether of reed or other type). In an alternative arrangement the accumulating means include a resistor capacitor network whereof the discharge time is many times the charge up time, for example ten times. In this case it may be desirable to include a resistor to limit the peak charging current to a value within the rating of the switching means, conveniently approximately equal to that rating.

In one form of the invention for responding to fall of an input signal (e.g., undervoltage), the switching means include a reed relay with normally closed contacts energised from a circuit including a capacitor charged by a pulsating signal corresponding to the input signal, so as to close the said contacts only when the capacitor charge falls below a given value. Alternatively or in addition for responding to rise of an input signal (e.g., overcurrent) the switching means may include a reed relay with normally open contacts energised from a circuit including a capacitor charged by a pulsating signal corresponding to the input signal, so as to close the said contacts only when the capacitor charge exceeds a given value.

In one arrangement the switching device is supplied through a potential divider and the accumulating means is connected to a feedback circuit arranged to modify the ratio of the potential divider during the pulses and hence to modify the operate-reset ratio.

Figure 2:
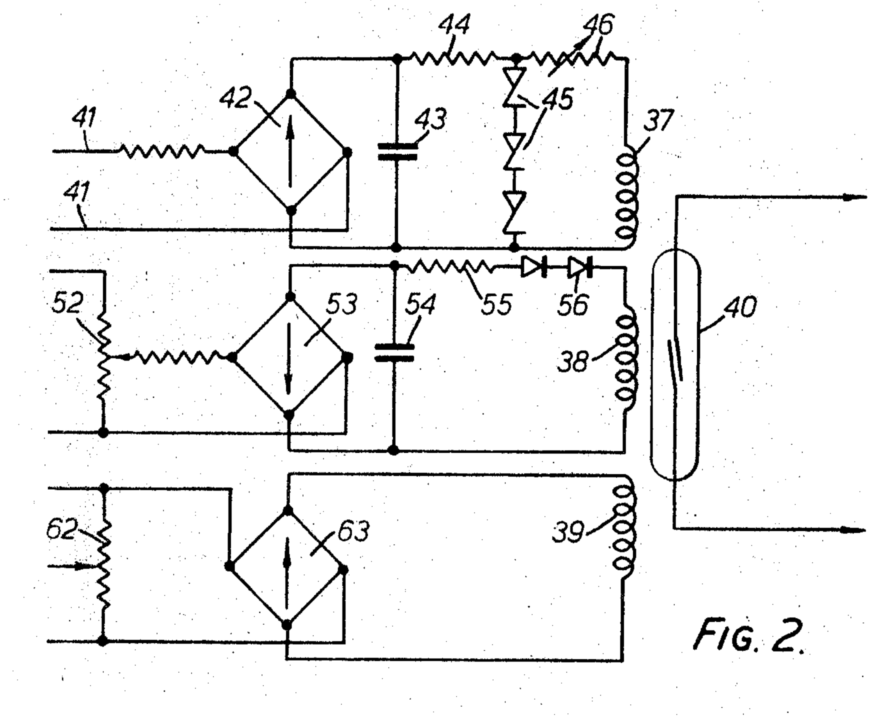
Figure 3:
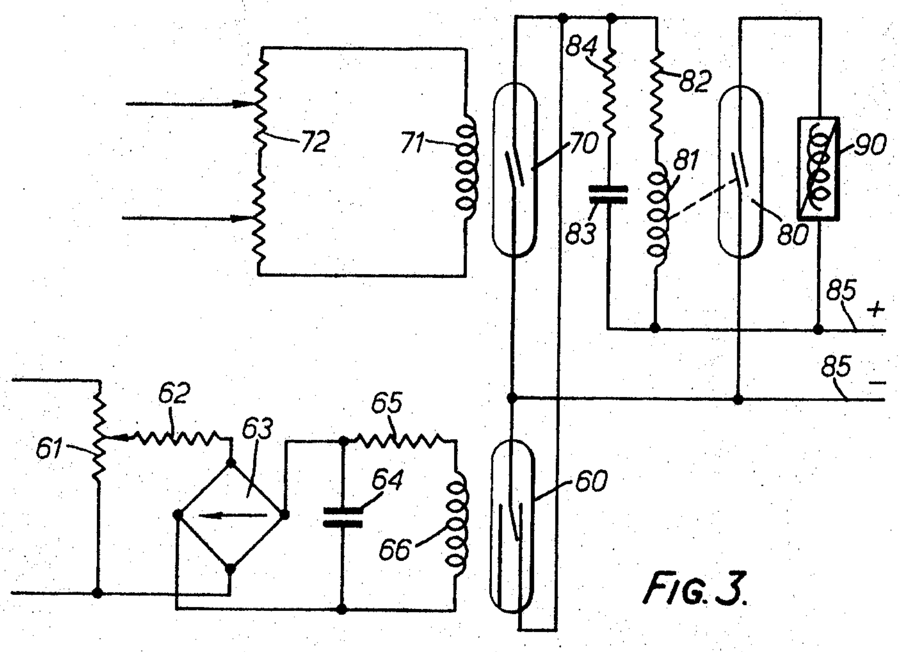
Figure 4:
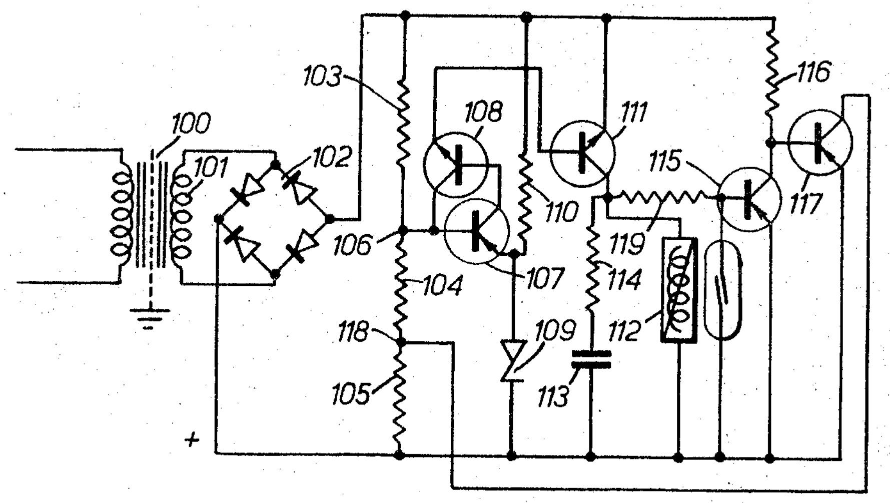

The invention may be put into practice in various ways but certain specific embodiments will be described by way of example with reference to the accompanying drawings, in which:

FIGURE 1 is a circuit diagram of an arrangement in which the switching device is in the form of a transistor trigger circuit, FIGURE 2 is a diagram of an impedance type circuit actuating a switching device in the form of a read type relay, FIGURE 3 is a diagram of an arrangement including both overcurrent and undervoltage control each incorporating a reed relay type switching device, and an accumulating circuit incorporating a further reed relay, and FIGURE 4 is a diagram of an arrangement employing a transistor trigger switching device and an accumulating circuit including a reed type relay with a feedback circuit to modify the operate-reset ratio.

In the embodiment shown in FIGURE 1 the invention is applied to a relay of static type for overcurrent protection. The secondary winding 11 of the input transformer 10 is connected to a bridge rectifier 12.

Also connected across the bridge output are a pair of potential dividers one comprising two resistors 15 and 16 and the other comprising a Zener diode 17 and a resistor 18. These may be considered as a bridge. Accordingly at a low value of current input the Zener diode 17 begins to conduct and establishes a substantially constant voltage, the bridge being unbalanced in one direction. As the input current increases the voltage across the corresponding resistor 15 of the other potential divider increases and when it exceeds that of the Zener diode the bridge becomes unbalanced in the opposite direction.

The output corners of the bridge are connected respectively to the base and emitter of an NPN transistor 20 so that at low input current it will not conduct but at high input current it will conduct.

The collector of the first transistor 20 is connected through a resistor 21 to the base of a second transistor 22 of PNP type having its emitter connected to the positive input terminal (i.e., the positive terminal of the output of the bridge rectifier 12) and its collector connected through a resistor 23 to the negative terminal and through a diode 24 to the base of a third transistor 25 also of PNP type. The third transistor 25 has its emitter connected directly to the positive terminal of the input and its collector connected through a resistor 26 to the negative terminal. Connected between the collector and emitter of the third transistor is a relay including coil 30 having appreciable inductance under the conditions of use. Thus the collector is connected through a pair of diodes 31 to one terminal of the relay whereof the other terminal is connected to the emitter, and to the positive terminal of the input. The relay coil is shunted by a diode 32 poled to prevent current flow from the input, and also by a Zener diode 33 to by-pass the relay in the event of excess voltage across it. Thus it will be appreciated that the relay coil 30 is virtually shunted by the third transistor 25, so that it will be energised when that transistor cuts off but will not be energised when it is conducting, as it normally is.

Accordingly, the operation is as follows. Below a predetermined value of input current on each half cycle the bridge 15, 16, 17, 18 will be unbalanced so that the first two transistors 20 and 22 remain cut off, but the third transistor 25 conducts substantially throughout the half cycle and virtually short circuits the relay coil 30 so that no substantial current passes through the latter.

When the instantaneous value of the input current exceeds a certain predetermined value the first two transistors 20 and 22 will fire and the third transistor will cut off. The latter causes input current to flow through the relay coil. Since the circuit is current fed, this diversion of current through the relay coil increases the voltage across the first potential divider thereby ensuring that the circuit will not reset until the instantaneous value of the input current has decreased considerably. The duration of a pulse of current will depend upon the extent to which the magnitude of the input current exceeds a certain threshold value.

The inductance of the relay coil 30, in conjunction with the diode 32 shunted across it, produces what may be termed an integrating effect causing the relay to respond to the cumulative effect of a number of pulses of current passed by the switching means, namely the third transistor 25. Thus at the end of a pulse, the current flowing through the relay coil will be diverted and will circulate through the diode 32 until the next pulse comes, whereupon the value of the current will be further built up so that if a sufficient number of pulses of sufficient magnitude follow one another in succession the relay 30 will respond.

The embodiment described above measures the single input current against its own setting as provided by the Zener diode of the bridge. In further embodiments the input signal is compared with a reference signal, or a number of input signals may be compared with one another or with one another and a reference signal. Thus the switching device may be fed with a differential signal comprising the difference between a pulsating or alternating operating signal and a substantially constant direct or smoothed polarising signal.

FIGURE 2 shows a switching circuit designed to respond (once in each half cycle) to give an impedance type response for a protective system. In this case the switching device is fed with a three-component signal comprising a substantially constant direct or smoothed polarising signal, a direct or smoothed restraining signal representing voltage in opposition to the polarising signal and an alternating or pulsating operating signal representing current reinforcing the polarising signal. The three signals are applied to three coils 37, 38 and 39 of a reed type relay 40.

Thus the polarising signal is obtained from a supply 41 through a bridge rectifier 42. The output of the rectifier is shunted by a capacitor 43, and also by a resistor 44 in series with a number of Zener diodes 45 giving a substantially constant direct current polarising voltage. One coil 37 of the reed type relay is connected across the Zener diodes in series with a variable trimming resistor 46.

The restraining signal, corresponding to the system voltage, is applied across a potentiometer 52 having its output connected to a bridge rectifier 53 of which the output is again shunted by a capacitor 54 and connected to a second winding 38 of the reed type relay in series with a resistor 55 and a pair of diodes 56. This winding is wound and connected so as to oppose the effect of the polarising signal.

The operating signal, corresponding to the system current, is applied to the tapping and one end of a potentiometer 62 whose two ends are connected to a bridge rectifier 63, whereof the output is connected directly to a third winding 39 of the reed type relay, the directions of winding and connection being such that the operating signal will reinforce the polarising signal.

The arrangement generally as described may be operated in a number of different ways. For giving impedance type protection the polarising signal would normally be adjusted so as to be just insufficient to operate the relay with normal system current and voltage. Accordingly with not restraining signal, that is to say a very low supply voltage, a very small operating signal will be required to close the relay once every half cycle. On the other hand with normal supply voltage and restraining signal a correspondingly higher operating signal, and hence system current, will be required to close the relay once every half cycle.

The arrangement just described may be modified to provide an undervoltage relay by reducing the smoothing of the voltage signal and increasing the polarising ampere turns, so that the effect of the polarising signal alone is to cause the relay to operate. In such an arrangement the mark-space ratio each cycle is a minimum of 1:9 and in addition the narrow pulses of operating signal are spiky rather than rounded so that a rather more refined integrator is required.

In a further embodiment, designed to provide an undervoltage relay, the reed relay has a changeover contact, and the normally made contact is arranged to make on a falling signal without external power. FIGURE 3 shows such an arrangement incorporating an undervoltage switching relay 60 combined with an over-current switching relay 70, both connected to a common integrator or accumulator circuit incorporating a reed relay 80.

Thus an input signal representing the system voltage is applied to a potentiometer 61 whereof the output is connected through a series resistor 62 to a bridge rectifier 63. The output of the bridge rectifier is shunted by a capacitor 64 and connected through a resistor 65 to the winding 66 of the reed relay 60 which has changeover contacts. Component values are choose so that the current through the winding 66 fluctuates considerably during each half cycle as the capacitor 64 charges and discharges, so that what would be referred to as the normally closed contacts of the relay remain open so long as the capacitor charge does not fall below a given value, and close only when it does fall below a predetermined value representing a predetermined fall of the system voltage. As before, the duration of closing of such contacts will depend upon the extent to which the system voltage falls below its predetermined value, and the pulses of current delivered to the integrating or accumulating circuit will produce a cumulative effect. In this arrangement a critical quantity is the amount of ripple on the signal fed to the relay 60, that is to say the difference between the maximum voltage to which the capacitor 64 is charged and the minimum voltage to which it is discharged during each half cycle. The ideal value of this ripple voltage is equal to the differential voltage between the operating and resetting voltages of the reed switch. If this condition is satisfied the relay will reset and close its normally closed contacts when the capacitor discharges below a predetermined voltage, and will remain reset (with its normally closed contacts closed) throughout the remainder of the half cycle.

The overcurrent reed relay 70 need only be provided with a single input coil 71 and it is unnecessary to rectify the signal applied to it. In this case the input signal corresponding to system current is supplied to the tappings and one end of a potentiometer 72 which is connected directly to the winding 71 of the relay. In this case the reed will operate on the alternating flux to close its contacts once in each half cycle when the input current exceeds a predetermined value.

The term integration is used herein somewhat loosely to cover the function of any arrangement causing the output from the switching device to produce a cumulative effect. Such an effect may be produced by the inherent characteristics of the reed type relay, advantage being taken of the inherently poor reset ratio of a normally reed switch. Thus if the reed relay responds when the peak signal just reaches a predetermined value it will not reset until the instantaneous value of the signal has decreased to a considerably lower value.

This effect may be extended by providing a resistor capacitor network of which the discharge time is many times (e.g., 10 times) the charge up time.

Thus one form of integrator or accumulator circuit, shown on the right of FIGURE 3, employs a second reed type relay 80. The coil 81 of this relay is connected in series with a resistor 82 and the two are shunted by a substantial capacitor 83 connected in series with a smaller resistor 84. These two branches are connected across a D.C. supply 85 through the contacts of the undervoltage and overcurrent reed relays 60 and 70 which are connected in parallel with each other. The contacts of the reed relay 80 are connected in series with a tripping relay 90 across the same D.C. supply 85.

FIGURE 4 shows an undervoltage arrangement in which the switching device is in the form of a transistor trigger circuit, and which incorporates a feedback to provide adjustable differential between operation and resetting.

Thus the secondary winding 101 of the input transformer 100 is connected to the input of a bridge rectifier 102 across the output of which (which may be termed the supply terminals) is connected a potential divider formed by three resistors 103, 104 and 105.

The junction 106 between the resistors 103 and 104 is connected to the input of a trigger circuit comprising a pair of transistors 107 (of PNP type) and 108 (of NPN type) each having its base connected to the collector of the companion transistor. The junction 106 is connected to the base of the transistor 107 whereof the emitter is connected to the positive supply terminal through a Zener diode 109 and to the negative terminal through a resistor 110.

The emitter of the transistor 108 is connected to the base of a transistor 111 of NPN type having its emitter connected to the negative supply terminal and its collector connected through the coil of a relay 112 to the positive supply terminal. The relay 112 is shunted by a capacitor 113 in series with a resistor 114.

It is believed that the operation of the circuit so far described will be clear. The Zener diode 109 keeps the emitter of the transistor 107 at a constant potential in relation to the positive terminal of the supply, so that as the instantaneous potential across the potential divider formed by the resistors 103, 104 and 105 rises during each half cycle of the input voltage a point is reached at which the potential of the base passes that of the emitter and the trigger transistors 107 and 108 suddenly conduct causing the transistor 111 to conduct for a portion of the half cycle.

This occurs in each half cycle in which the level of the input voltage remains above a certain value and each pulse of current increases the charge on the capacitor 113 until the voltage across it is sufficient to operate the relay 112.

In order to provide an adjustable reset the collector of the transistor 111 is also connected through a resistor 119 to the base of a transistor 115 of PNP type having its emitter connected to the positive supply terminal, and its collector connected through a resistor 116 to the negative supply terminal and directly to the base of a transistor 117. The transistor 117, which is of PNP type, has its emitter connected to the positive supply terminal and its collector connected to the junction 118 between the resistors 104 and 105 of the potential divider.

Thus in operation when the input voltage is low and relay 112 is deenergized transistor 115 is cut off and transistor 117 conducts and virtually short-circuits the resistor 105 of the potential divider, thus modifying the value of input voltage at which the voltage of the junction 106 of the potential divider and hence the base of the transistor 107 will be level with that of its emitter as held by the Zener diode 109.

Accordingly, as the input voltage level again rises it may have to reach only 80% of its former predetermined value before pulses are produced, the capacitor 113 charges up, and the relay 112 is energized. However, when the input voltage level falls it may have to fall to perhaps 40% of its former predetermined level before pulses stop, the capacitor 113 discharges, and the relay 112 is deenergized.

When the circuit of FIGURE 4 is used to respond to undervoltage, the trigger circuit 107, 108, 111 continues to deliver pulses and the relay 112 remains energized so long as the input voltage level is above a predetermined value, undervoltage being indicated when pulses stop and the relay is deenergized. For such applications the relay 112 is preferably provided with so called "normally closed" contacts, which in fact close to provide an alarm or tripping signal when the voltage level falls and the relay 112 is deenergized.

It will be appreciated that the invention is not limited to the specific embodiments described by way of example. In particular where reed type relays have been described they may in general be replaced by other suitable types of relay or by static circuits for example transistor circuits. Where a switching action is required it may be provided by employing a circuit of sufficient sensitivity or by employing a trigger or bistable circuit.

What we claim as our invention and desire to secure by Letters Patent is:

1. An electrical level-responsive circuit, comprising:

input means for receiving alternating or pulsating signals, switching means rendered operative in response to a first predetermined signal amplitude of each half cycle or pulse of said alternating or pulsating signal applied to said input means and rendered inoperative in response to a second predetermined signal amplitude of said each half cycle or pulse, said first predetermined signal amplitude being greater than said second predetermined signal amplitude to form a first reset ratio of said switching means substantially below unity, said switching means providing output signal pulses in response to said first signal level, accumulating means for storing said pulse signal output, said accumulating means providing a signal output at a predetermined signal amplitude produced by the storage of said signal pulses, said predetermined amplitude forming a second reset ratio with said first predetermined amplitude substantially equal to unity.

2. A circuit according to claim 1 wherein the accumulating means include a component having appreciable inductance and further including a diode shunting said component permitting a circulating current in said component between pulses from the switching device.

3. A circuit according to claim 2 wherein said accumulating means further includes a relay and said component is connected in series with said relay.

4. A circuit according to claim 1 wherein said accumulating means include a resistor capacitor network having a discharge time substantially greater than the charge time.

5. A circuit according to claim 1 wherein said input means establishes said first and said second predetermined levels of the alternating or pulsating signal.

6. A circuit according to claim 5 wherein said means for establishing the first and second signal amplitudes includes additional accumulating means for storing signals representative of the amplitude of each half cycle or pulse of the alternating or pulsating signal, said switching means including first relay means with normally open contacts, said first relay means being energized to close said contacts only when signals stored by said additional accumulating means exceed a third predetermined signal amplitude.

7. A circuit according to claim 6 wherein said additional accumulating means stores a signal representative of the voltage of each half cycle or pulse of said alternating or pulsating signal, said switching means further includes second relay means including contacts connected in parallel with contacts of said first relay means, said second relay means being responsive to a signal representative of the current value of said alternating or pulsating signal, said accumulating means including a resistance-capacitance network having a greater discharge time than charge time and serially connected with said parallelly connected first and second relay contacts, said accumulating means further including third relay means responsive to a predetermined signal stored by said capacitor.

8. A circuit according to claim 5 wherein said accumulating means operates to modify said first and second predetermined signal amplitudes to alter said first reset ratio.

9. A circuit according to claim 8 wherein said accumulating means includes feedback means, said feedback means being connected with a portion of said input means, said feedback means being responsive to said pulse signal output to condition said input means to establish different first and second predetermined signal amplitudes.

10. A circuit according to claim 9 wherein said feedback means comprises a transistor, said transistor being connected to said input means to render a portion of said input means inoperative in response to the activation of said accumulating means.

References Cited

UNITED STATES PATENTS

| | | | |
|---|---|---|---|
| 2,504,827 | 4/1950 | Goldsborough | 317—31 X |
| 3,023,345 | 2/1962 | Williams. | |
| 3,134,054 | 5/1964 | Le Cronier et al. | 317—155.5 X |
| 3,155,879 | 11/1964 | Casey et al. | 317—155.5 X |
| 3,197,677 | 7/1965 | Helin | 317—155.5 |
| 3,300,689 | 1/1967 | Beddoes | 317—31 X |
| 3,307,075 | 2/1967 | Park | 317—31 X |
| 3,337,771 | 8/1967 | Weinger | 317—27 X |
| 3,340,435 | 9/1967 | Hoel | 317—31 X |
| 3,341,748 | 9/1967 | Kammiller | 317—148.5 |

LEE T. HIX, Primary Examiner

U.S. Cl. X.R.

307—130, 131, 235; 317—148.5, 155.5